Figure 1:
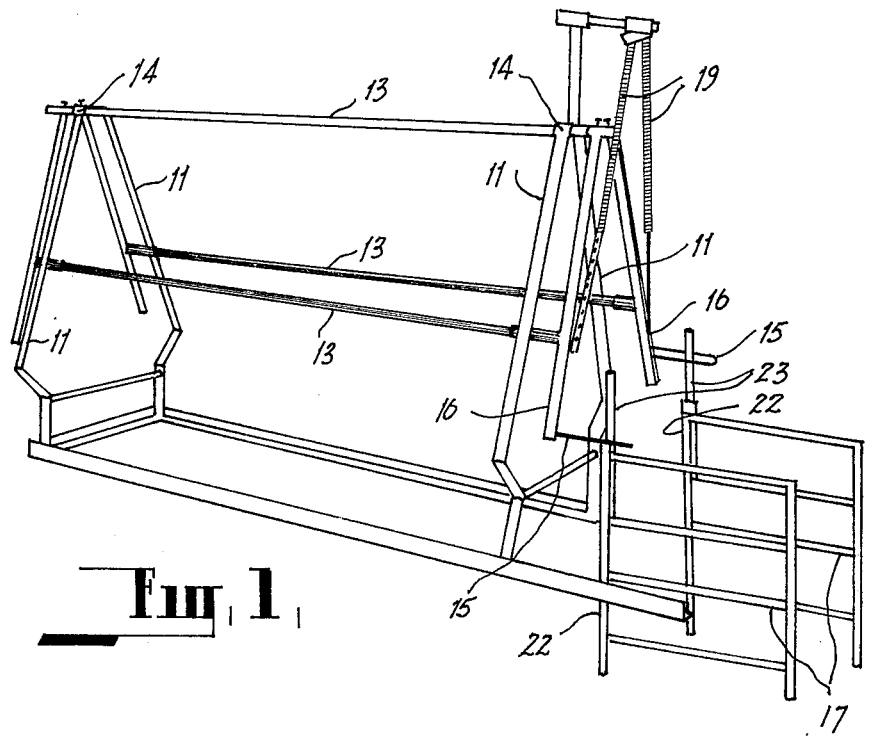

United States Patent [19]

Hicks

[11] 4,006,717
[45] Feb. 8, 1977

[54] CONTROL MECHANISM FOR A DRAFTING RACE

[76] Inventor: Walter John Hicks, Post Office, Pingrup, Western Australia, Australia, 6343

[22] Filed: Aug. 25, 1975

[21] Appl. No.: 607,532

[30] Foreign Application Priority Data

Aug. 23, 1974 Australia ........................... 8639/74

[52] U.S. Cl. ............................................ 119/155
[51] Int. Cl.² ...................................... A01K 29/00
[58] Field of Search ............... 119/155, 99, 98, 103

[56] References Cited

UNITED STATES PATENTS

| | | | |
|---|---|---|---|
| 2,786,449 | 3/1957 | Dahlerup | 119/99 |
| 3,051,127 | 8/1962 | Norburg | 119/99 |
| 3,299,856 | 1/1967 | Fogle | 119/155 X |

Primary Examiner—Hugh R. Chamblee
Attorney, Agent, or Firm—William Anthony Drucker

[57] ABSTRACT

A control mechanism for operating the drafting gate of a drafting race comprising a superstructure adapted to be mounted above the race, an operating handle suspended from the superstructure substantially parallel with the race for rocking movement about a substantially horizontal axis substantially parallel with the race and at a position so that it can be gripped by an operator standing at one side of the race, one end of the operating handle being coupled to the drafting gate to effect rotation thereof.

6 Claims, 5 Drawing Figures

U.S. Patent    Feb. 8, 1977    Sheet 1 of 2    4,006,717

CONTROL MECHANISM FOR A DRAFTING RACE

This invention relates to an improved control mechanism for a drafting gate.

The method of drafting sheep in the past has been carried out by having the gate operator stand at one end of the race whilst generally a second operator or attendant ensures that the sheep are evenly fed into the race. This generally is necessary when two sheep attempt to enter the race at the same time, they become wedged together and someone must untangle the animals so that the drafting process may continue. With the drafting gate operator standing in front of the sheep they are reluctant to move forward and the whole process is slowed down due to the inefficiencies of its operation.

It is an object of this invention to provide a mechanism for controlling the operation of a drafting gate which will enable the operator to stand well clear of the gate and thereby achieve a faster drafting rate.

It is also envisaged that by providing the drafting operator with a control means that extends the full length of the race the operator would be able to free any sheep that may wedge together within the race and at the same time be able to control the operation of the drafting gates.

In one form the invention resides in a control mechanism for operating the drafting gate of a drafting race comprising a superstructure adapted to be mounted above the race, an operating handle suspended from the superstructure substantially parallel with the race for rocking movement about a substantially horizontal axis substantially parallel with the race and at a position so that it can be gripped by an operator standing at one side of the race, one end of the operating handle being coupled to the drafting gate to effect rotation thereof.

In another form the invention resides in a control mechanism for a drafting gate comprising a plurality of substantially inverted V shaped members mounted transversely upon the longitudinal side walls of a drafting race, the apex of said members supporting and allowing a free pivoting action of the upper longitudinal side of a substantially rectangular operating handle, said operating handle being mounted so as to hang between the two sides of the inverted V shaped members. Projecting downwardly and outwardly from one end of the lower longitudinal side of the operating handle is a drafting gate engaging means, said drafting gate engaging means lying in the same plane as the operators handle.

Preferably an overcentre spring or similar device is fitted to the drafting gate engaging means to assist in holding the drafting gate in the selected position.

Figure 2:
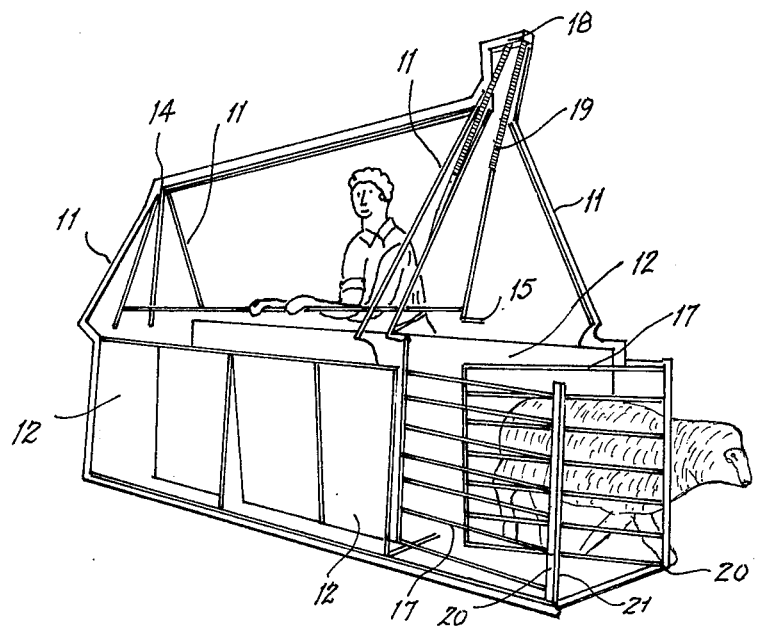
Figure 3:
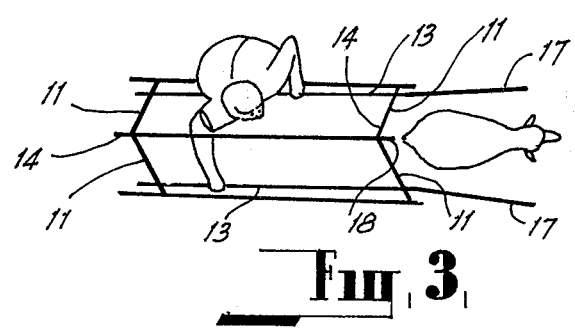
Figure 4:
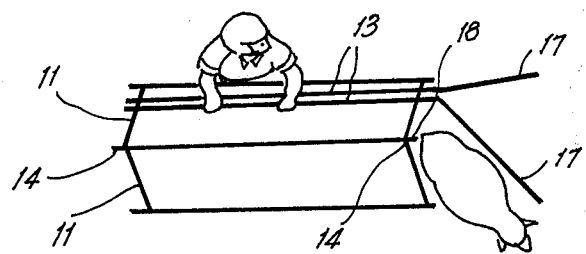
Figure 5:
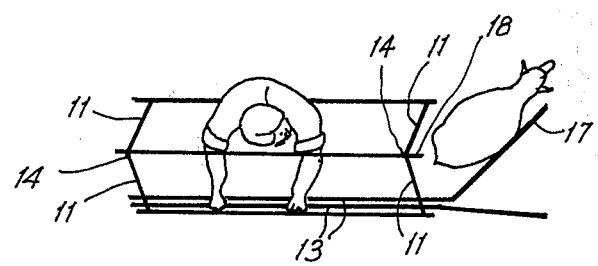

The invention will be better understood by reference to the following description of one specific embodiment as shown in the accompanying drawings wherein:

FIG. 1 is an isometric view of the invention;
FIG. 2 is a isometric view of the invention in use and fitted to a drafting race;
FIG. 3 is a schematic plan view of the invention with the drafting gates in one position;
FIG. 4 is a schematic plan view of the invention with the drafting gates in a second position and
FIG. 5 is a schematic plan view of the invention with the drafting gates in a third position.

In this embodiment a control mechanism for a drafting gate is constructed comprising a plurality of substantially inverted V shaped members 11 mounted upon the longitudinal side walls 12 of a drafting race. The sides of the race itself at the forward or inlet end are substantially vertical and after a distance of two or three feet slope downwardly and inwardly so that the race is substantially "V" shaped when viewed in cross section. This assists to ensure that only one animal at a time can enter the race and that the animals must feed through the race in single file. In the case of drafting sheep, the wider upper portions of the race allow for an animal with a full clip of wool to pass comfortably through the race. A substantially rectangular shaped operating handle 13 is suspended from the apex 14 of the inverted V shaped members so as to be freely pivoted between the sides of said members. A drafting gate slide engaging means 15 is mounted to one end of the lower portion 16 of the said operating handle 13, and mounted in such a manner as to be in the same plane as the operating handle 13. The upper end of the control mechanism near the drafting gates 17 is fitted with an upwardly projecting central overhead support member 18. A spring 19 is attached from the central overhead support 18 to the lower portion 16 of the said operating handle. A unit constructed with one operating handle and one drafting gate would allow for a two-way draft of animals whilst a unit containing two operating handles (as shown in the drawings) and two drafting gates enables a three-way draft to take place.

In operation the control mechanism is mounted upon the longitudinal sides of a conventional race or alternatively may be constructed as part of a race wherein the race is preferably of the previously described tapered type. The drafting gates 17 have one vertical side 20 hingedly mounted to support posts 21. The opposite vertical side 22 of the drafting gates 17 is provided with an upwardly projecting pin 23 which engages with the slide 15. Movement by the operator of handle 13 causes drafting gate engagement means 15 to pivot gate 17 about its hinge 20. The overcentre spring 19 enables the gates to be held in any one of the three possible positions as shown in FIGS. 3, 4 and 5 of the drawings. To draft animals through to the centrally located yard both operating levers are moved to either side of the race, and they are held in this position by the respective over-center springs and animals move as shown in FIG. 3 of the drawings. To be able to draft animals to a yard either side of the centrally located yard, then one of the operating handles is drawn towards the other. This has the effect of closing off the central opening and providing a clear opening to the yard situated opposite the two operating handles. The operating handles will remain in this position until manually altered by the operator.

The drafting gate control is a simple, effective and precise control unit enabling the operator to maintain complete control over the drafting gates from any position along the race.

The unit, in most situations, eliminates the need for an assistant as it allows the operator to maintain control of the drafting gates while he moves along the race to clear any balking or jammed sheep.

An added advantage of this control unit is that it allows sheep to be drafted from the best advantage point i.e. front for ear marks, or tags, middle for condition or rear to identify daggy or flystruck sheep or teased ewes.

Whilst the invention has been described with reference to one specific embodiment it is not restricted thereto. The description whilst being made with reference to sheep can equally be applied to other animals.

Similarly whilst the invention has been described with reference to a drafting gate control mechanism of one handle, one gate or two handles, two gates it is also possible to install several units in combination.

I claim:

1. A control mechanism, for operating a drafting gate of a drafting race of the kind having an elongated structure defining a passage for animals and a drafting gate pivotably mounted for lateral movement across an end of said structure such that an animal emerging from said passage passes to one side or the other of said gate, said control mechanism comprising a superstructure adapted to be mounted above said race structure, an elongated operating handle disposed along and adjacent to said race structure at a position such that it can be gripped by an operator standing at one side of the race structure, said handle being suspended from said superstructure and pivoted thereto for rocking movement about a substantially horizontal axis, and means for coupling said operating handle to said drafting gate to permit pivoting of said gate.

2. A control mechanism, as claimed in claim 1, wherein:
   i. said superstructure includes a plurality of inverted substantially V-shaped members for mounting transversely upon said race structure, the apex of said members supporting said handle,
   ii. said handle is substantially rectangular and includes an upper longitudinal side by which it is freely pivoted on said V-shaped members, said handle hanging between the two sides of the V-shaped members,
   iii. said coupling means projects downwardly and outwardly from one end of a lower longitudinal side of said handle and in the same plane as said handle.

3. A control mechanism for a drafting gate as claimed in claim 2 wherein an upwardly and outwardly projecting central overhead support member is mounted upon the apex of one said inverted V shaped member with the outward projection being towards the drafting gate, and wherein a spring is attached to said central overhead support member and to said operating handle to hold said handle in the selected position.

4. A control mechanism for a drafting gate as claimed in claim 2 wherein said drafting gate engaging means comprises a slide adapted to engate an upwardly projecting pin provided on the drafting gate.

5. A control mechanism, for operating drafting gates of a drafting race of the kind having an elongated structure defining a passage for animals and two drafting gates mounted in transversely spaced positions for lateral movement across an end of said structure such that an animal emerging from said passage passes to one side or the other of the respective gate, said control mechanism comprising:
   a. a superstructure adapted to be mounted above said race structure, said superstructure including a plurality of inverted substantially V-shaped members for mounting tranversely upon said race structure,
   b. two substantially rectangular operating handles each including an upper longitudinal side by which it is freely pivoted on and supported from the apex of said V-shaped members, said handles hanging between the two sides of the V-shaped members,
   c. two drafting gate engaging means projecting downwardly and outwardly from one end of a lower longitudinally side of a respective handle and in the same plane as said handle,
   d. an upwardly and outwardly projecting central overhead support member mounted upon the apex of one said V-shaped member with the outward projection being towards the drafting gates, and
   e. respective spring means coupled to said central overhead member and to said operating handles to hold them in the selected position.

6. A control mechanism, as claimed in claim 5, wherein each said drafting gate engaging means comprises a slide adapted to engage an upwardly projecting pin provided on the respective drafting gate.

* * * * *